United States Patent [19]

Ros

[11] Patent Number: 5,209,593

[45] Date of Patent: May 11, 1993

[54] DEVICE FOR STORING DOCUMENTS

[75] Inventor: Johannes F. Ros, Paris, France

[73] Assignee: Office Data Europe (ODE) B.V., Netherlands

[21] Appl. No.: 770,109

[22] Filed: Oct. 2, 1991

[30] Foreign Application Priority Data

Oct. 12, 1990 [NL] Netherlands ............... 9002226
Jul. 5, 1991 [NL] Netherlands ............... 9101174

[51] Int. Cl.⁵ ............................................. B42F 13/00
[52] U.S. Cl. ...................................... 402/77; 206/204;
206/472; 281/15.1; 402/73; 402/503
[58] Field of Search ............... 206/204, 472; 220/343;
281/15.1, 42, 45; 402/73, 77, 503

[56] References Cited

U.S. PATENT DOCUMENTS 4,223,787  9/1980  Lowry et al. .............. 220/343 X
4,518,275  5/1985  Rauch, III et al.

FOREIGN PATENT DOCUMENTS 0375925  4/1990  European Pat. Off.
8236741  5/1983  Fed. Rep. of Germany
1168498  10/1969  United Kingdom
2203097  10/1988  United Kingdom Primary Examiner—Paul A. Bell
Attorney, Agent, or Firm—Ostrolenk, Faber, Gerb & Soffen

[57] ABSTRACT

A file, formed by a rear panel, a spine part and a front panel, interconnected by means of flexible strips (live hinges), a file mechanism being disposed on the rear panel, near the spine part. According to the invention the rear panel, the spine and the front panel are designed as a case made of plastic, provided with raised edges closing against each other, with a grip formed by two grip parts on the (long) side of the front and the rear panel facing away from the spine. A case for storing documents, made up of two shell parts of plastic which are both hingedly connected to a spine part, and which are provided with raised edges closing against each other, with a grip formed by two grip parts on the (long) side of each of the shell parts facing away from the spine. According to the invention a file mechanism is provided on one of the shell parts, near the spine part, while the width of the shell parts corresponds essentially to the width of A4 format plus the width of the file mechanism. Such a case can, leaving out the file mechanism, be provided with a ring mechanism which is fitted near the (long) side of one of the shell halves facing away from the spine, preferably a four-ring mechanism of the type suitable for computer reports.

9 Claims, 5 Drawing Sheets

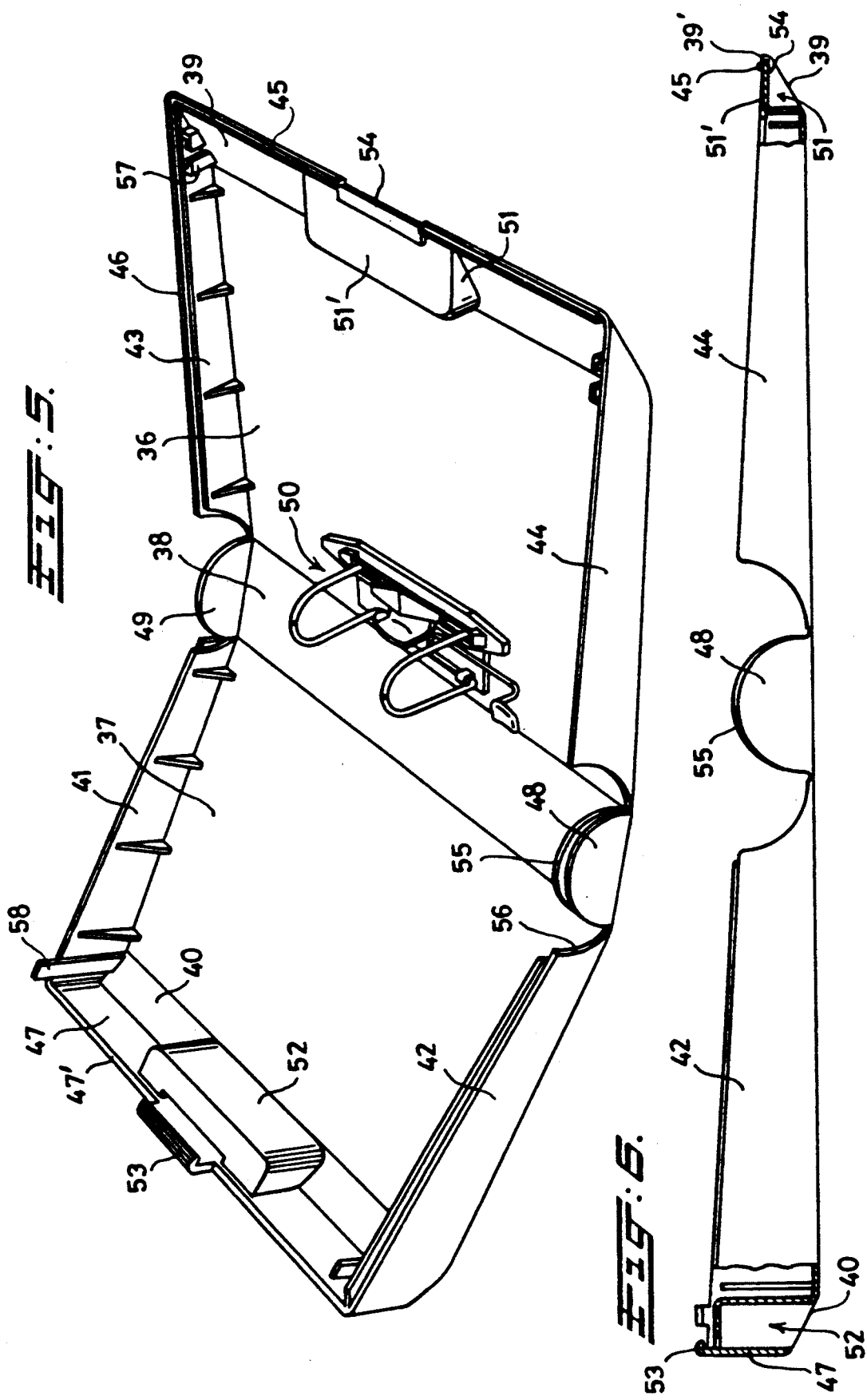

DEVICE FOR STORING DOCUMENTS

BACKGROUND OF THE INVENTION

Document files are known, formed by a rear panel, a spine part and a front panel, interconnected by means of flexible strips (live hinges), a file mechanism being disposed on the rear panel, near the spine part.

File mechanisms (also widely known with the German term "Ordnermechanik"), apart from improvements to details, are of a traditional shape or design which makes it possible to store a relatively large stack of documents, while that stack is also easy to turn over in full or partially in order to permit reading of a particular document inside the stack or to permit its removal by opening of the mechanism.

Such mechanisms are still being put on the market solely inside a simple unit comprising a front and rear panel, connected by a spine part. Such a folder is always open on all other sides. Apart from the disadvantage of the contents becoming dusty, a major disadvantage of this is that, in particular after a longer period of time, certain documents come loose and sit askew, the result of which is anything but a neat unit. This is further aggravated by the fact that in practice loose documents are often added with paper clips, instead of being perforated and fully fixed in the mechanism.

THE OBJECTS OF THE INVENTION

The first object of the present invention is to provide a solution to the aforementioned problems. More particularly it is an object of the invention to provide a document file having a file mechanism which may be substantially of the traditional type with its inherent advantages, and which can be closed so that no dust can enter and, when loose documents are added at a later moment, they will also be within the enclosure.

SUMMARY OF THE INVENTION

The file of this invention is characterized in that the rear panel, the spine and the front panel are made in the form of a case made of plastic, and in that they are provided with raised edges closing against each other, with a grip formed from two grip parts on the (long) side of the front and the rear panel facing away from the spine.

Apart from the sizing, the file is thus designed like a case for storing documents, made up of two shell parts of plastic which are both hingedly connected to a spine part, and which are provided with raised edges closing against each other, with a grip formed from two grip parts on the (long) side of each of the shell parts facing away from the spine.

Such cases are always standardized to A4 format, insofar as they are intended for storing documents. They are then provided with so-called quick-binders or systems with flexible binding prongs. Different formats also exist, and they are then made suitable for storing all kinds of articles such as floppy disks, bookkeeping cards, hard disks for computers, punched cards, magnetic tapes and all kinds of other articles. None of the known cases is designed with the traditional file mechanism.

It can thus also be said that the invention, starting from the known cases for storing documents, as described briefly above, is characterized in that a file mechanism is provided on one of the shell parts, near the spine part, while the width of the shell parts corresponds essentially to the width of A4 format plus the width of the file mechanism. The last-mentioned measurement adjustment is vitally important compared with cases which are suitable only for A4 formats, because a file mechanism is of a width which is a multiple of all other quick-binding or binding prong systems. It is still possible to set a case designed in this way upright on shelves, because its depth measurement is not essentially greater than that of the traditional file, which was in fact of a greater depth than an A4 folder or case.

Whether viewed as a document file provided with a file mechanism embodied as a case or as a document case containing such a file mechanism, it is preferable that the file or case is further designed in such a way that at the (long) side, facing away from the spine, of the rear panel or of the shell part to which the file mechanism is fixed no raised edge is present, while at the corresponding place on the other shell part a raised edge is present. In particular, if also the raised edges at the short sides connect to the raised edge of one side and to the end edge of the shell part without raised edge at the other side, and thus have a decreasing height, this provides a solution to the need to make use of both the long sides and the bottom and top corners of the documents during turning over of pages and during loading.

In cases for the storage of documents or other articles as mentioned, it is known to make the raised edges at the (long) sides of the main faces of the two shell parts facing away from the spine adjoin a transition strip running at an angle of no more than 45° relative to the panels or the main faces. In the case of document cases it is also known for grip halves to be formed at the level of the transition strips running at an angle. All known grip halves are, however, formed by through openings, so that the whole grip also comprises a through opening through which the fingers of the hand can be inserted.

By contrast it is preferable according to the invention to proceed in such a way that the grip halves are blind holes which are formed in the above-mentioned transition strips.

In this way, first of all, the effective internal area of the case is slightly increased, not so much for the documents themselves, as for their handling. On the other hand, what is achieved by this feature is that, through the connection with the remainder of the shell parts via the material through which the blind holes are formed, the end faces of the raised edges of the two shell parts exhibit greater rigidity and strength. Such holes which are not through-running, but are blind, need not be a disadvantage as grips, because the application with a file mechanism is mainly one of filing documents and taking hold of a file when it is to be worked with, while the files in the form of cases according to the invention are in fact suitable to be carried along but need not primarily serve as a case with carrying grip.

On the other hand, as a result of the advantage of the greater stability, the possibility is created of designing the case further in such a way that at one of the raised edges, at the position of the grip half, a single closure is fitted, in the form of a snap hook.

This contrasts with known cases for documents which are almost all provided with two closures. The simplification to a single closure means a not insignificant simplification in the injection mould, but it also facilitates opening.

It is, of course, important for a manufacturer to standardize or as much as possible to develop application variants for the same injection moulded product, in particular on account of the excessively high mould costs of the injection moulds. On the other hand, it is advantageous for the user if storage systems for different items still have the same appearance.

From these points of view the invention has developed another interesting application variant. If the case described above is taken as the starting point, it can be designed leaving out the file mechanism in such a way that a ring mechanism is present, and is fitted near the (long) side of one of the shell parts which faces away from the spine, if applicable the shell part other than that in which the lateral access openings are provided. This ring mechanism is preferably a four-ring mechanism of the type suitable for computer reports.

In this way it is possible to use the case for storing 132-column computer paper. When the case is open the edge of the stack of paper forming a computer printout extends several centimetres past the spine strip, thus into the region of the shell part other than that in which the ring mechanism is fixed. When the case is shut that bottom part of the stack can be folded double along with the case.

This produces a system by which the above-mentioned 132-column computer paper can be stored within a shelf depth in the filing department which is the same as that of traditional files.

It is pointed out that in cases for storing documents the fixing mechanism is always right next to the spine strip, while here according to the invention it is proposed that it should be fitted near the grip. It is through this measure that for storing one acquires the disposal over a width which is much greater than the single width of a main face of a shell part.

The invention will be explained in greater detail below with reference to the appended drawing of two examples of embodiments.

THE DRAWINGS

FIG. 3 shows the case in an embodiment with ring mechanism, in open state;

Figure 5:
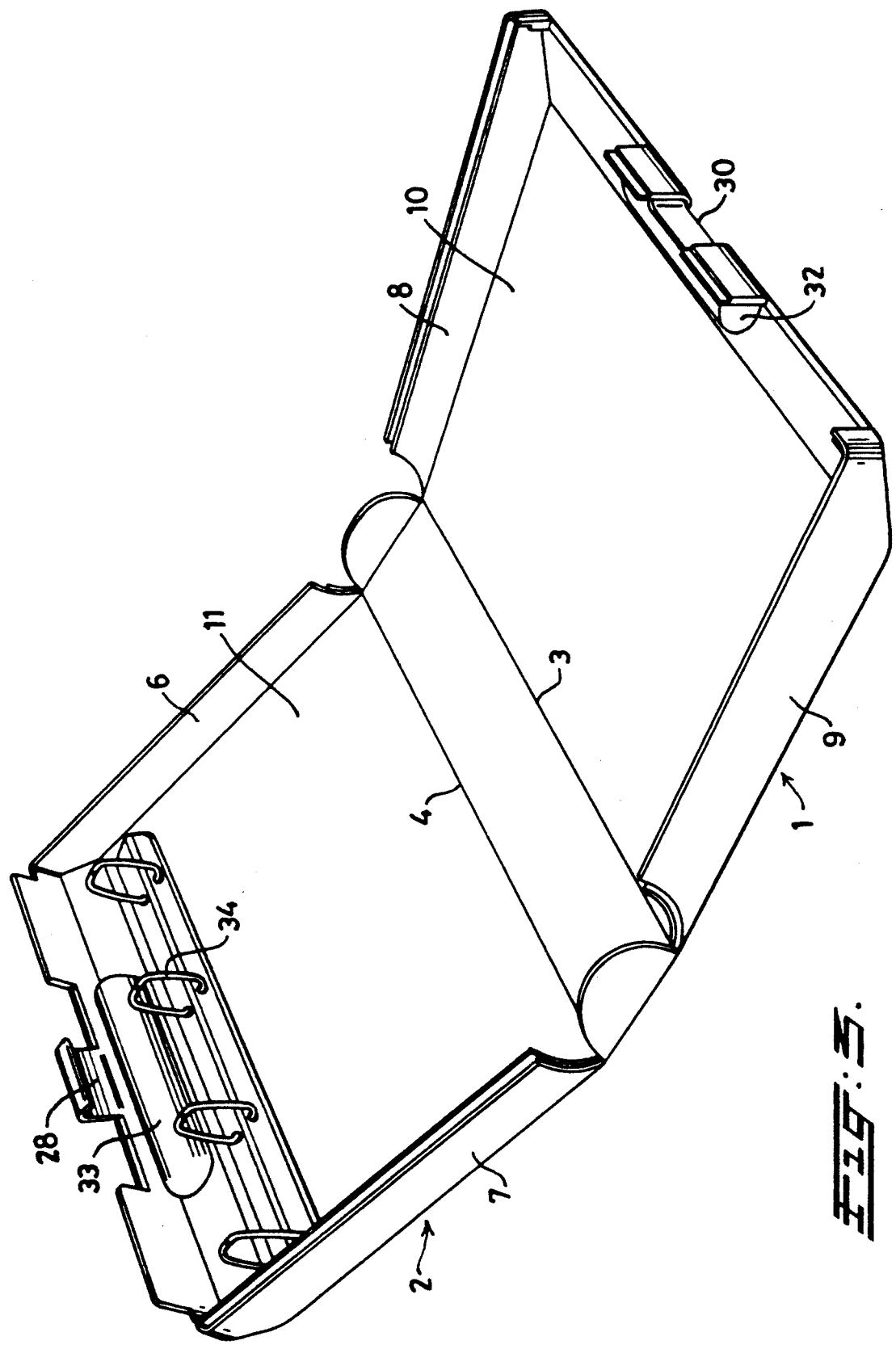
Figure 4:
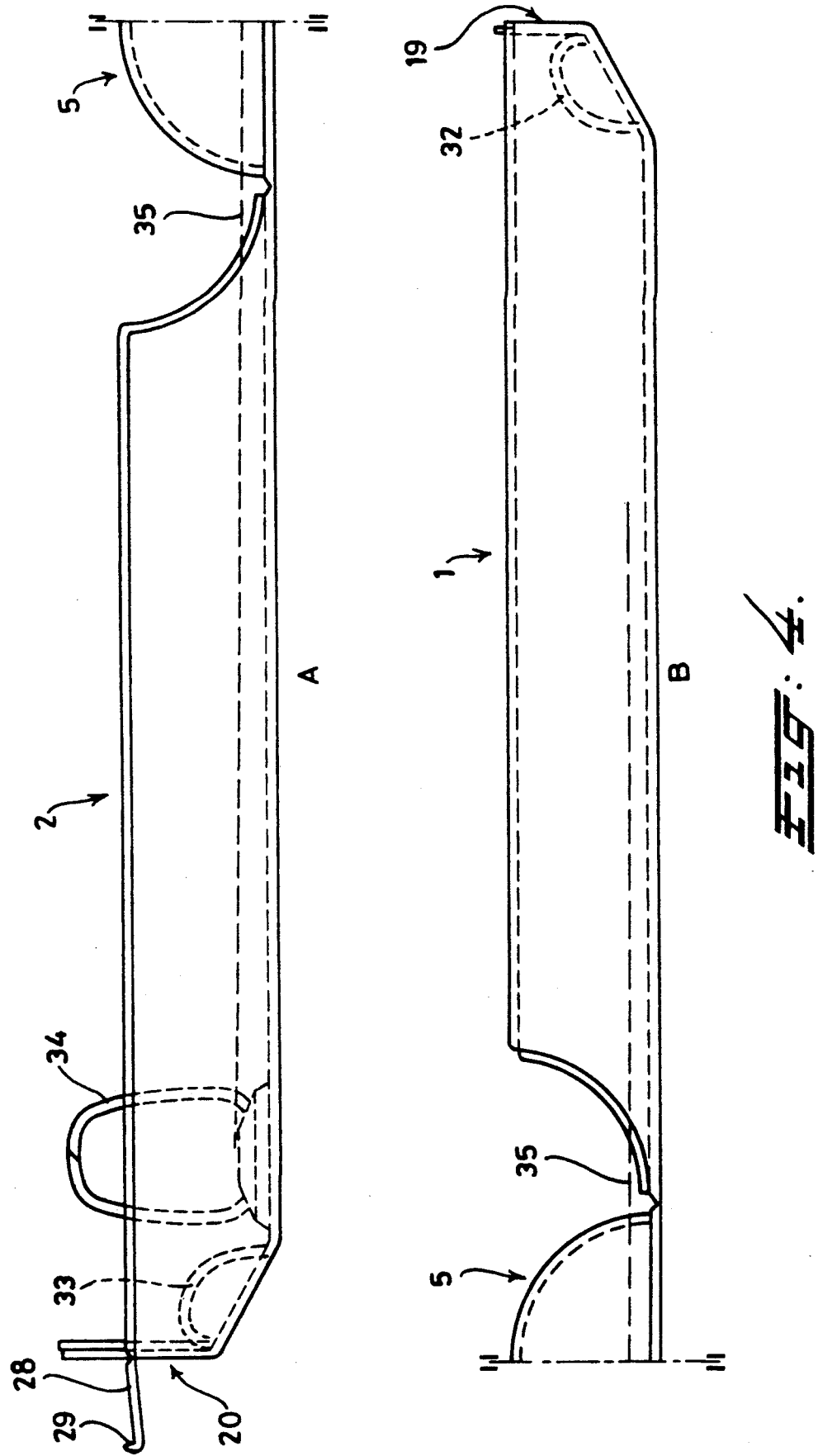
FIG. 4 shows a view in the direction parallel to the length of the but through the embodiment of FIG. 3 in the fully open state, FIG. 5 another embodiment of the case in the form of a case in an almost fully open state.

FIG. 6 a view, in the same way as FIG. 4, of the embodiment according to FIG. 5, at two places partially cut away in order to show the shape of the blind grips.

DESCRIPTION OF THE PREFERRED EMBODIMENTS

Figure 1:
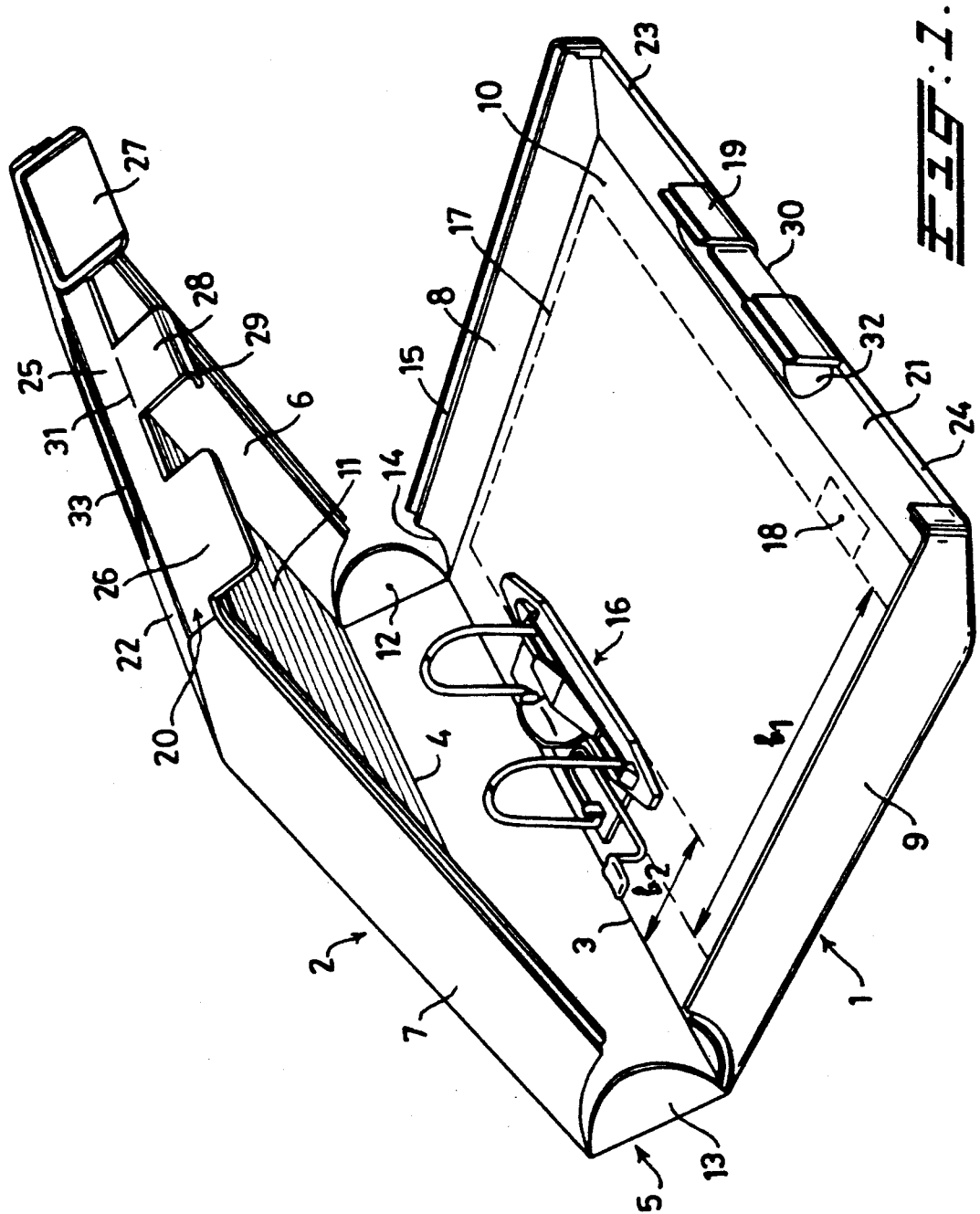
FIG. 1 shows embodiment of the case file according to this in a partially open state.

The case file in FIG. 1 comprises a bottom shell part indicated by 1 and a top shell part indicated by 2, and which shell parts are connected by flexible strips 3 and 4 respectively — also known as film hinges or live hinges — to a spine part indicated in its entirety by 5.

All these parts are provided with raised edges along the outer periphery. The raised edges 6 to 9 at the short sides of the main faces 10, 11 of the shell parts are of the same shape, of course mutually symmetrical relative to the spine. The raised edges 12 and 13 at the spine part 5 are also of the same shape, in this instance semi-circular, to which quadrant-shaped boundaries such as 14 of the raised edges 6 to 9 connect. The partially circular shape of these parts is not vitally important for the present invention; any interconnecting shape can be selected for the raised edges to connect to the spine part of the shell parts. It is seen as a detail that all free edges of the raised edges are made stepped, as indicated by 15, always alternating with the raised part at the outside or at the inside, so that the raised edges adjacent to each other engage when the case is closed.

A file mechanism 16 is provided in the shell part 1, in the place traditional as such, on the face 10 adjacent to the hinge line 3 to the spine part 5.

A document placed in file mechanism 16 by means of perforations is shown by a dashed line 17. It can be seen from this that the width of the main face 10 of the shell part 1 — and, of course, also that of the shell part 2 — corresponds to the width measurement $b_1$ of the A4 format plus the width measurement $b_2$ of the file mechanism. Thus defined, it can be seen that by producing the perforation the document overlaps the base plate of the file mechanism 16 slightly, and it is precisely thereby that space is gained at the other side for the tab of any tab divider system to be inserted between, also indicated by broken lines and indicated by 18. Of course, a small additional space can also be added outside, as is customary, in order to accommodate irregularities in the stacking. The width measurement of the file case defined as $b_1 + b_2$ is thus a minimum measurement, and this is a characteristic of the case according to the invention, because all known cases for storing documents do not have the relatively large partial measurement $b_2$, but a much smaller width of all kinds of quick binder mechanisms, generally only 2 cm. The measurement $b_2$ of a file mechanism is around 5 cm.

The raised edges 19, 20 on the shell parts 1 and 2 do not adjoin the main faces 10, 11 of the shell parts directly, as is the case on the short sides, but by means of transition strips 21, 22. Said transition strips extend at an angle of less than 45° in the embodiment shown around 30°, relative to the main faces 10, 11. In the first place a small practical enlargement of the interior space of the case is thereby obtained, not of so much benefit in the closed state as when the stored documents are being used.

According to the invention the raised edge 19 on the long side of the shell part 1 bearing the file mechanism 16 is limited to a centre region of around ⅓rd of the length of the long side. Above and below this the shell part then ends with the edges 23, 24 of the slanting transition strip 21. In this way a lateral access opening for the stack of documents in the case is produced at those two places, as a result of which it is easy to leaf through both at the top corner and at the bottom corner of the stack. The height of the raised edge 19 corresponds to the height of the other raised edges such as 8 and 9.

The raised edge 20 on the long side of the shell part 2 is formed in a corresponding manner, as follows. The centre region 25 of the raised edge 20 is of a height which is also essentially equal to the height of the adjacent raised edges 6 and 7 on the short side. In addition, there is then a part 26 of double height, fitting into the opening along the edge 24, and at the other side a part 27 of corresponding height, fitting into the opening along the edge 23, the latter part then, in a manner which is known per se, being provided with means for bearing an adhesive or insert label. The centre part 25 is, however, also provided with a lip 28 of greater height, provided with a snap hook 29 which can engage around an edge part 30 on the other side in order to keep the case closed.

This closing lip 28 is again in a manner known per se fixed by means of a film hinge 31 to the part 25 of the raised edge.

A blind hole 32, 33 is formed in each of the two slanting strips 21 and 22, over a distance corresponding approximately to the centre parts 19 and 25 of the raised edges. These holes serve as grip parts. The case can consequently be used in the closed state by putting the thumb in one hole and several fingers in the other hole.

Figure 2:
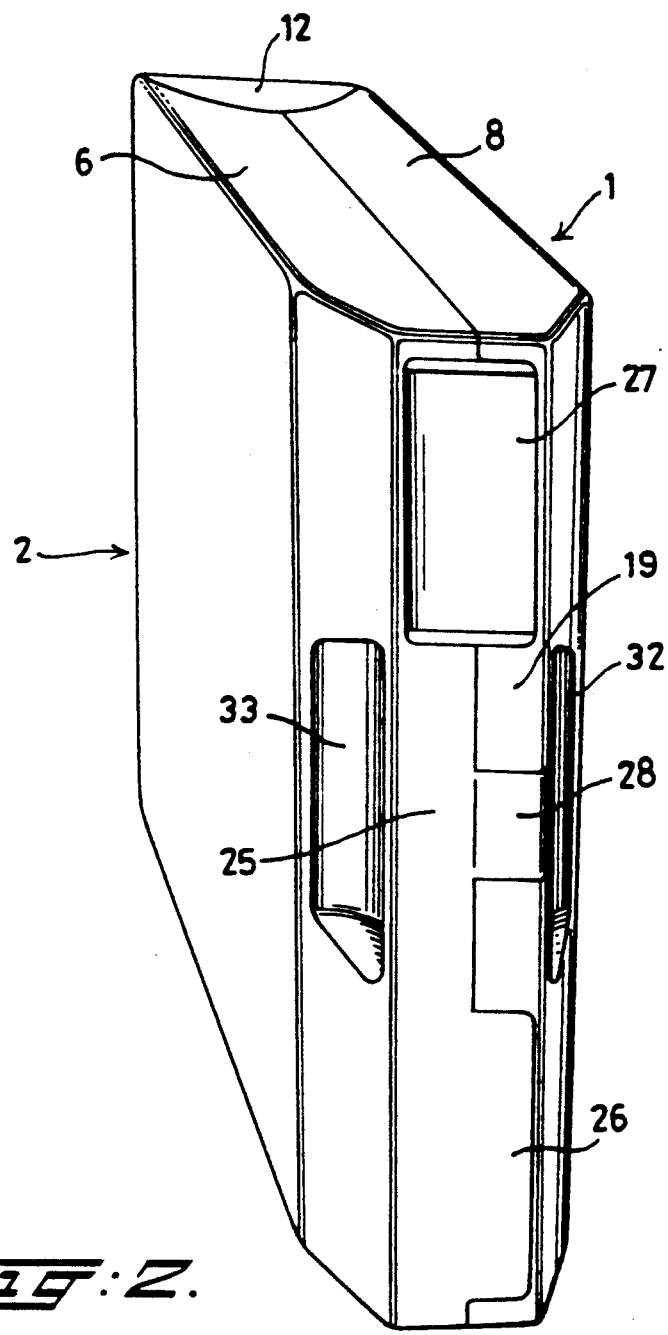
FIG. 2 shows the case closed.

The correct shape of this hole, which is preferred in the invention, is best seen from FIG. 2. FIG. 3 shows the same case as that shown in FIG. 1, but with the file mechanism 16 omitted. Instead of it, a ring mechanism 34 is fitted on shell part 2, but this time not near the spine as is common, but actually at the outer long side, i.e. near the grip 33. This is a mechanism which is known per se. It can be a 2-ring mechanism, but is preferably of the 4-ring type which is suitable for storing perforated computer paper. Through this positioning, computer paper of 132-column format can be stored, having a length which is shown to scale by a broken line 35. It can thus be seen that this paper format runs over the width of the shell part 2, the spine part 3, and also over some distance over the width of the shell part 1. When the case is flapped shut the last part of the paper is folded double by itself.

The case in the embodiment shown in FIGS. 5 and 6 has a number of improvements compared with that of FIG. 1. The main faces 36, 37 of the two shell parts and the spine part 38 connected thereto by film hinges remain unchanged; next also the slanting strips 39 and 40 connecting to the main faces at the long sides. The similarity applies to the shape, but in particular also to the dimensions which are important according to the invention.

Raised edges 41 to 44 at the short sides of the main faces are present, but have now become a different shape, which can best be seen from the view in FIG. 6. They are no longer of equal and constant height, but run at an angle. This can be explained further by pointing out that at the outer long side of the shell part to which the main face 36 belongs there is no longer any raised edge at all, apart from the stepped shape, indicated by 45, which serves to permit a good closure. The stepped shape at this point forms a continuation of the stepped shape 46 at the short side which was also present in the embodiment according to FIG. 1 (indicated by 15). At the outer long side of the main face 37 of the other shell part a raised edge, indicated by 47, does connect to the slanting strip 40, over the entire long side. The line of the top edges of the raised edges, such as 40, 42 in FIG. 6, connects thereto, i.e. runs from the top edge 47' of the raised edge 47, via half the height at the position of the semi-circular raised edges such as 48 at the spine part 38, to the end edge 39' of the slanting strip 39.

The most important effect of the differing points in the shape described thus far is that the documents bound into the file mechanism 50 are easily accessible at the outside from top to bottom, but also near the corner points along the top side and the bottom side, because the raised edges 44, 46 there too are still low.

In order to make this possible, the dimensions of the blind hole 32 in FIG. 1 also had to be adapted. The blind hole 51 at the righthand side in the slanting strip 39 now is of such low depth that it does not project above the edge 39' of the slanting face. As can be seen from the cross-section in the cut-away part on the right in FIG. 6, the depth of the blind hole 51 in fact decreases to zero near the end edge 39' of the slanting strip 39.

At the other side, shown in cross-section on the left in FIG. 6, the blind hole 52 is proportionately deeper, almost the entire height of the raised edge 47 being used. The great depth of the blind hole 52 and the shallow depth of the blind hole 53 mean that the case can be carried in such a way that the forefingers are in hole 52; they will then reach so far that they go past the centre plane of the case when it is closed, which means that the weight of the case can be carried stably with the fingers, so that it is almost enough for the thumb to be in the shallow hole 51.

A snap lip 53 is moulded onto the raised edge 47 over a short distance above the blind hole 52, which snap lip is very low in height, just sufficient to permit a snap action about a matching thickened part 54 fitted over a corresponding length on the top wall 51' of hole 51.

The next detail improvement is applied in the semicircular raised edges 48 and 49. A stepped edge 55, which was not present in the embodiment according to FIG. 1, is present. The raised part of the step shape 55 is now situated on the inside, and the raised part 56 of the step shape of the connecting quadrant-shaped edges such as 56 is situated on the outside closely corresponding thereto. Pressing in of the raised edges 43 to 44 relative to the parts 48 and 49 is prevented in this way.

Finally, it is worth mentioning the fact that two T-shaped guide parts are moulded onto the inside of the short raised edges 43 and 44, as indicated by 57, as a result of which a guide groove is formed. Two moulded-on guide ribs such as 58 then fit into said two grooves at the other side. These guides will now make the case close better near the outer corners.

What is claimed is:
1. A portable file including:
  an elongated spine and generally rectangular first and second main panels each including first and second spaced parallel relatively short sides and third and fourth spaced parallel relatively long sides disposed at opposite ends of said first and second sides;
  said panels at their said third sides being pivotally connected to said spine along opposite long sides thereof, each of said panels also including raised first and second edges along the respective first and second sides;
  said panels and said spine being constructed of plastic, said panels and said spine being foldable relative to one another between a closed and open position;
  when in said open position said panels extending in opposite directions from said spine;
  when in said closed position said panels confronting one another, said first edges engaging each other, said second edges engaging each other, and said panels cooperating with said spine to define a generally closed container;
  a document fixing means secured to one of said panels in operative position to be disposed inside of said generally closed container;
  said first and second edges of said first panel being of a height that tapers gradually, being taller near said spine than near said fourth side of said first panel;
  said first and second edges of said second panel being of a height that tapers gradually, being shorter near said spine than near said fourth side of said second panel.

2. A portable file as set forth in claim 1 in which said fourth side of said second panel is provided with a raised edge and said fourth side of said first panel is void of a raised edge.

3. A portable file as set forth in claim 2 in which the raised edge at the fourth side of the second panel is generally of a uniform height that is approximately the same as that of the first and second edges of said second panel at locations thereof where they are tallest.

4. A portable file as set forth in claim 1 also including manually engageable grip means formed by first and second blind holes in the respective first and second panels adjacent their respective said fourth sides.

5. A portable file as set forth in claim 4 in which the blind holes are unequal in depth with one of them crossing on imaginary center plane that is disposed at a half thickness location of said generally closed container.

6. A portable file as set forth in claim 4 in which the first and second panels each includes an angles transition region along its said fourth side;
each of said blind holes being formed in an individual one of said transition regions.

7. A portable file as set forth in claim 1 in which the document fixing means is disposed adjacent said spine.

8. A portable file as set forth in claim 7 in which the document fixing means is secured to the first panel.

9. A portable file as set forth in claim 7 in which the document fixing means is of a type that includes a plurality of elongated split loops and a manually operated lever for opening and closing said split loops.

* * * * *